(12) United States Patent
Susca et al.

(10) Patent No.: US 11,859,553 B2
(45) Date of Patent: Jan. 2, 2024

(54) FLUID INJECTION SYSTEMS HAVING FLUID LINE PURGING

(71) Applicant: Hamilton Sundstrand Corporation, Charlotte, NC (US)

(72) Inventors: Ryan Susca, Windsor, CT (US); Steve Doerner, Enfield, CT (US); Charles E. Reuter, Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/486,237

(22) Filed: Sep. 27, 2021

(65) Prior Publication Data

US 2022/0010730 A1 Jan. 13, 2022

Related U.S. Application Data

(62) Division of application No. 16/593,370, filed on Oct. 4, 2019, now Pat. No. 11,156,163.

(51) Int. Cl.
*F02C 7/232* (2006.01)
*F02C 7/22* (2006.01)
(Continued)

(52) U.S. Cl.
CPC .............. *F02C 7/232* (2013.01); *F02C 7/222* (2013.01); *F02C 7/228* (2013.01); *F23K 5/06* (2013.01);
(Continued)

(58) Field of Classification Search
CPC .......... F02C 7/222; F02C 7/228; F02C 7/232; F02C 9/30; F05D 2260/602;
(Continued)

(56) References Cited

U.S. PATENT DOCUMENTS

| 5,881,550 A | 3/1999 | Toelle |
| 6,216,439 B1 | 4/2001 | Nakamoto |

(Continued)

FOREIGN PATENT DOCUMENTS

WO   WO-03093666 A1   11/2003

OTHER PUBLICATIONS

Extended European Search Report for European Patent Application No. EP19215813.7, dated Jun. 25, 2020.

*Primary Examiner* — Scott J Walthour
(74) *Attorney, Agent, or Firm* — Locke Lord LLP; Gabrielle L. Gelozin; Daniel J. Fiorello

(57) ABSTRACT

A fluid injection system can include a main flow line, a primary flow line connected to the main flow line, and a primary flow valve disposed between the primary flow line and the main flow line and configured to allow injectant flow to the primary flow line from the main flow line in an open primary flow valve state, and to prevent injectant flow to the primary flow line from the main flow line in a closed primary flow valve state. The system can include a secondary flow line connected to the main flow line and a secondary flow valve disposed between the secondary flow line and the main flow line and configured to selectively allow injectant flow to the secondary flow line from the main flow line in an open secondary flow valve state, and to prevent injectant flow to the secondary flow line from the main flow line in a closed secondary flow valve state. The system can include a primary purge branch configured and a secondary purge branch configured to be in fluid communication with a purge gas line to receive a purge gas flow from the purge gas line.

5 Claims, 3 Drawing Sheets

(51) Int. Cl.
*F23K 5/18* (2006.01)
*F23K 5/14* (2006.01)
*F23K 5/06* (2006.01)
*F02C 7/228* (2006.01)
*F02C 9/30* (2006.01)

(52) U.S. Cl.
CPC ............... *F23K 5/147* (2013.01); *F23K 5/18* (2013.01); *F02C 9/30* (2013.01); *F05D 2260/602* (2013.01); *F05D 2260/607* (2013.01); *F05D 2260/608* (2013.01); *F23K 2300/206* (2020.05)

(58) Field of Classification Search
CPC ......... F05D 2260/607; F05D 2260/608; F23K 5/06; F23K 5/147; F23K 5/18; F23K 2300/206
See application file for complete search history.

(56) References Cited

U.S. PATENT DOCUMENTS

| | | |
|---|---|---|
| 6,438,963 B1 | 8/2002 | Traver et al. |
| 9,121,352 B2 | 9/2015 | Montagne et al. |
| 9,404,424 B2 | 8/2016 | Morawski et al. |
| 9,650,955 B2 | 5/2017 | Sabelhaus et al. |
| 2005/0103382 A1* | 5/2005 | Carter .................. F16K 31/406 137/487.5 |
| 2007/0101723 A1 | 5/2007 | Kunkle et al. |
| 2018/0016991 A1 | 1/2018 | Pobbati et al. |
| 2018/0135530 A1 | 5/2018 | Ewens |

\* cited by examiner

FLUID INJECTION SYSTEMS HAVING FLUID LINE PURGING

CROSS-REFERENCE TO RELATED APPLICATIONS

This application is a divisional of U.S. patent application Ser. No. 16/593,370, filed Oct. 4, 2019, the entire content of which is incorporated herein by reference.

FIELD

This disclosure relates to fluid injection systems, e.g., to injection systems for turbomachines.

BACKGROUND

The extreme operating environments (temperature and pressure) that aircraft injection systems are subjected to tend to cause nozzle build-up and clogging, especially in systems that do not have a continuous duty cycle. In order to reduce nozzle build-up, it is advantageous to evacuate the flow lines when the system is not in use. There are two main methods, the first being use of the injectant fluid pumping system to suction the fluid out of the flow lines with an ejection system. Here, the injectors are closed off and the ejection system will evacuate the flow lines system. Unfortunately, the injection nozzles must close somewhere internally and the wetted volume between the closure point and the injection point cannot be evacuated. This remaining fluid will eventually work its way out of the nozzle either due to suction from the air stream or vaporization, but those repeated short exposures can cause nozzle build-up.

The second method is to use an external source to purge the lines, such as using compressed air to purge the lines from the metering point all the way to the injection point, pushing all the remaining fluid into the air stream. An issue with this purge system is that a method is needed to seal the injection system upstream of the metering point from the compressed air to prevent air entering the upstream system. This becomes further complicated when multi-stage injection (in this case, a system with multiple injection ports) is required and stages are activated and purged individually. This requires many components to ensure proper separation of the compressed air and injectant fluid during injection and purging.

Such conventional methods and systems have generally been considered satisfactory for their intended purpose. However, there is still a need in the art for improved fluid injection systems. The present disclosure provides a solution for this need.

SUMMARY

A fluid injection system can include a main flow line configured to pass injectant flow therethrough, a primary flow line connected to the main flow line and configured to provide a primary portion of the injectant flow from the main flow line to a primary injector, and a primary flow valve disposed between the primary flow line and the main flow line and configured to allow injectant flow to the primary flow line from the main flow line in an open primary flow valve state, and to prevent injectant flow to the primary flow line from the main flow line in a closed primary flow valve state. The system can include a secondary flow line connected to the main flow line and configured to provide a secondary portion of the injectant flow from the main flow line to a secondary injector, and a secondary flow valve disposed between the secondary flow line and the main flow line and configured to selectively allow injectant flow to the secondary flow line from the main flow line in an open secondary flow valve state, and to prevent injectant flow to the secondary flow line from the main flow line in a closed secondary flow valve state.

The system can include a primary purge branch configured to be in fluid communication with the primary flow line in the closed primary flow valve state and to not be in fluid communication with the primary flow line in the open primary flow valve state. The system can include a secondary purge branch configured to be in fluid communication with the secondary flow line in the closed secondary flow valve state and to not be in fluid communication with the secondary flow line in the open secondary flow valve state. The primary purge branch and the secondary purge branch can be configured to be in fluid communication with a purge gas line to receive a purge gas flow from the purge gas line.

The first purge branch and the second purge branch can be in fluid communication such that there is no valve between the first purge branch and the second purge branch. The primary flow valve can be a pressure actuated shuttle valve and is configured to transition from the closed primary flow valve state to the open primary flow valve state when pressure in the main flow line exceeds a pressure in the purge gas line such that the primary flow valve prevents fluid communication between the primary purge branch and the primary flow line when the pressure in the main flow line exceeds a pressure in the purge gas line.

The primary flow valve can be connected between the main flow line and the primary flow line on a front side thereof and between the primary purge branch and the primary flow line on a back side thereof. The primary flow valve can be configured to block purge gas from the primary flow line in the open primary flow valve state and to block injectant from the primary flow line in the closed primary flow valve state.

The secondary flow valve can be connected between the main flow line and the secondary flow line on a first side thereof and between the secondary purge branch and the secondary flow line on a second side thereof. The secondary flow valve can be configured to block purge gas from the secondary flow line in the open secondary flow valve state and to block injectant from the secondary flow line in the closed secondary flow valve state.

The secondary flow valve can be a solenoid valve having an energized position and a de-energized position. The energized position can correspond to the open secondary flow valve state and the de-energized position can correspond to the closed secondary flow valve state. The opposite is contemplated herein.

The system can include a controller configured to control the secondary flow valve to move the secondary flow valve between the open secondary flow valve state and the closed secondary flow valve state. The controller can be configured to execute a purge sequence from an operational state where injectant flow is flowing through both the primary and secondary flow lines. The purge sequence can include closing the secondary flow valve to shut off injectant flow to the secondary flow line from the main flow line while simultaneously causing purge gas flow to purge the secondary flow line. The purge sequence can include allowing injectant flow in the primary flow line to reduce in pressure to below the purge gas pressure to cause the primary flow valve to move to the closed primary flow valve state simultaneously causing purge gas flow to purge the primary flow line.

In accordance with at least one aspect of this disclosure, a fuel system can include a fluid injection system having a single controllable valve and a single passive valve arranged to cause selective and/or sequential purging of a secondary flow line and a primary flow line. The controllable valve and the passive valve can be the only valves in the fluid injection system. The controllable valve can be a solenoid valve. The passive valve can be a pressure actuated shuttle valve. Any other suitable valve types are contemplated herein.

In accordance with at least one aspect of this disclosure, a method can include operating a single controllable valve to purge a secondary flow line of a fluid injection system with a purge gas flow, and causing a passive valve to open using a purge gas pressure to cause purging of a primary flow line of the fluid injection system after purging the secondary flow line. Operating the controllable valve can include closing the secondary flow valve to shut off injectant flow to the secondary flow line from the main flow line while simultaneously causing purge gas flow to purge the secondary flow line. Causing a passive valve to open can include allowing injectant flow in the primary flow line to reduce in pressure to below the purge gas pressure to cause the primary flow valve to move to the closed primary flow valve state simultaneously causing purge gas flow to purge the primary flow line. Any other suitable method(s) and/or portion(s) thereof are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
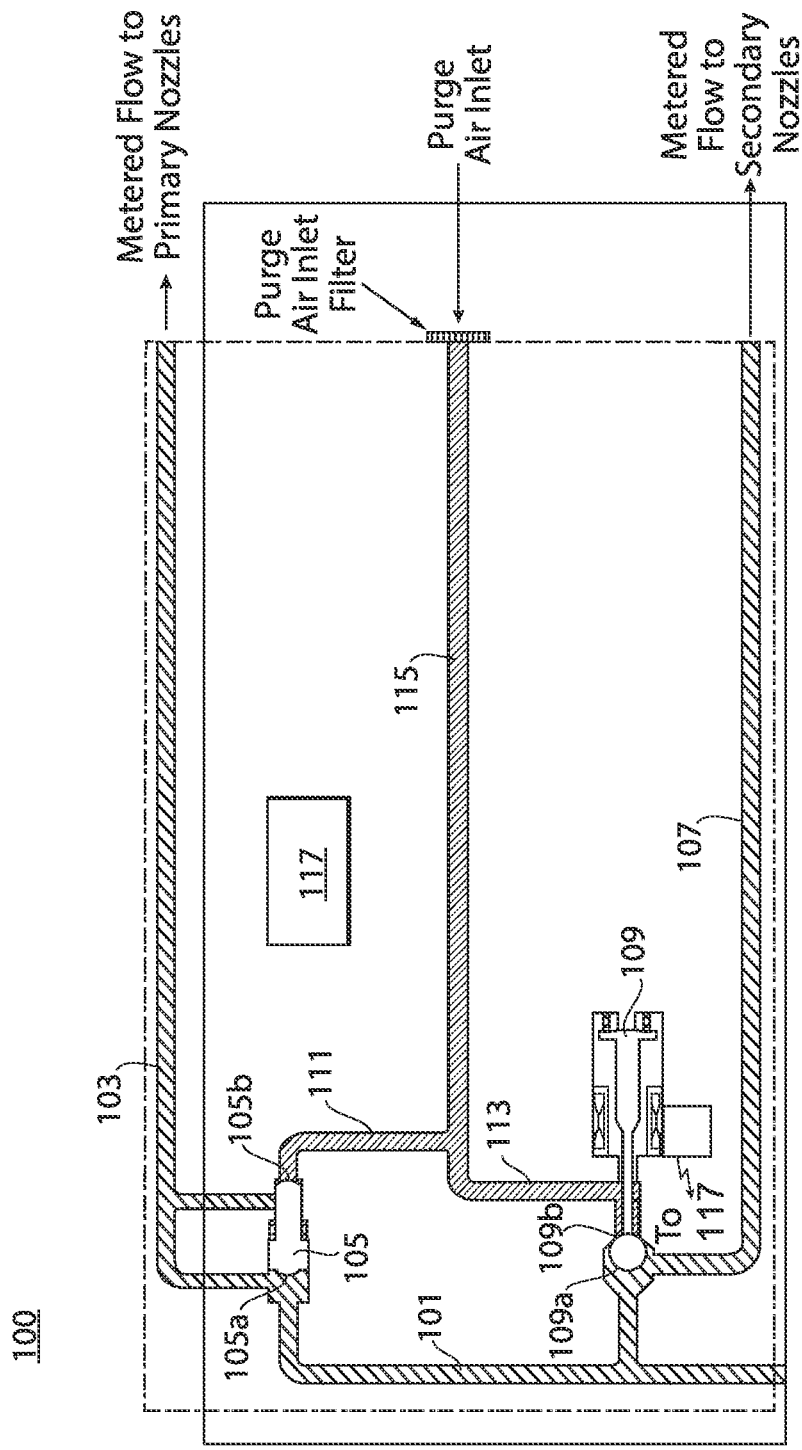
FIG. 1 is a schematic diagram showing an embodiment of a system in accordance with this disclosure, shown in an operational mode were injectant is flowing through both a primary flow line and a secondary flow line.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3.

Figure 2:
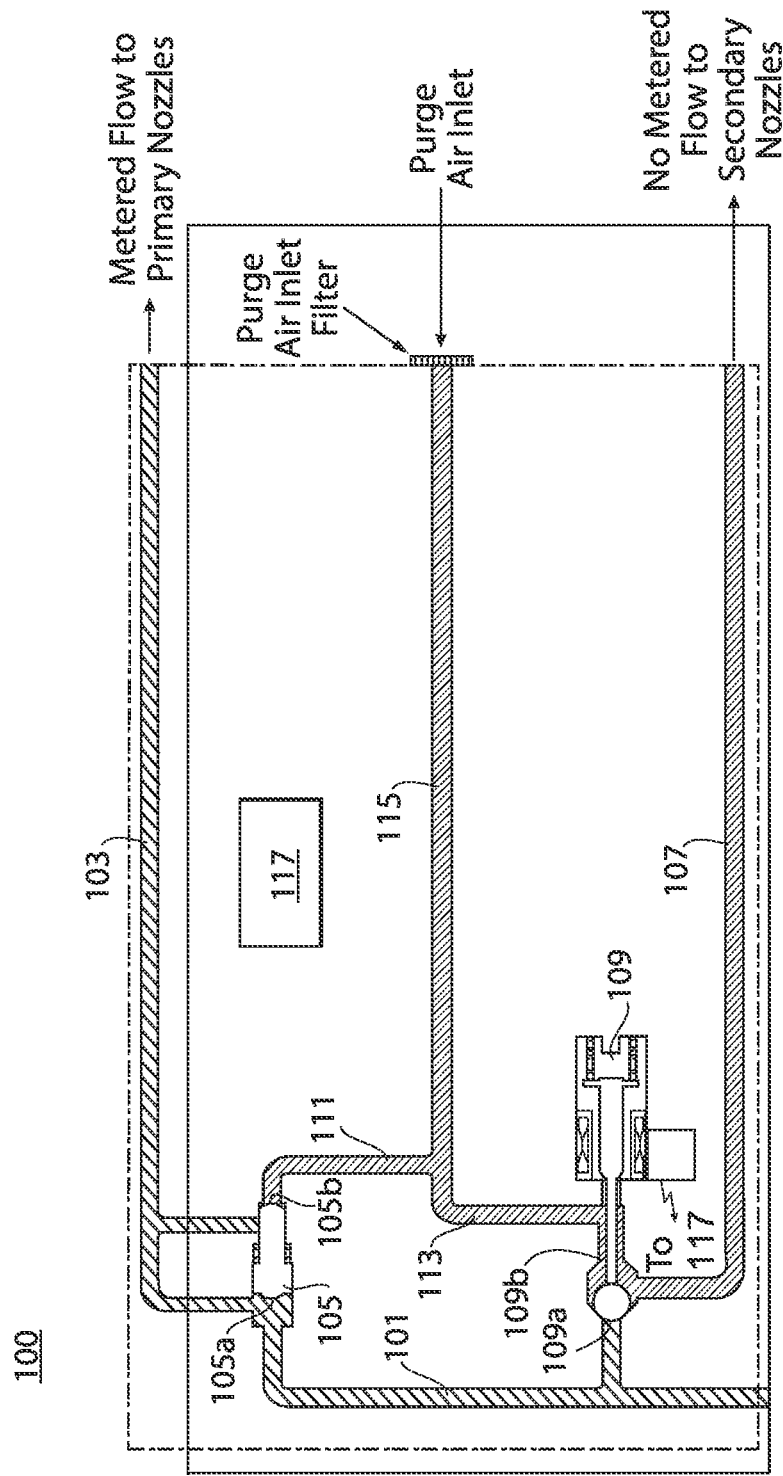
FIG. 2 is a schematic diagram of the embodiment of FIG. 1, shown in a secondary flow line purge mode where injectant is flowing through the a primary flow line and the secondary flow line has been purged.
Figure 3:
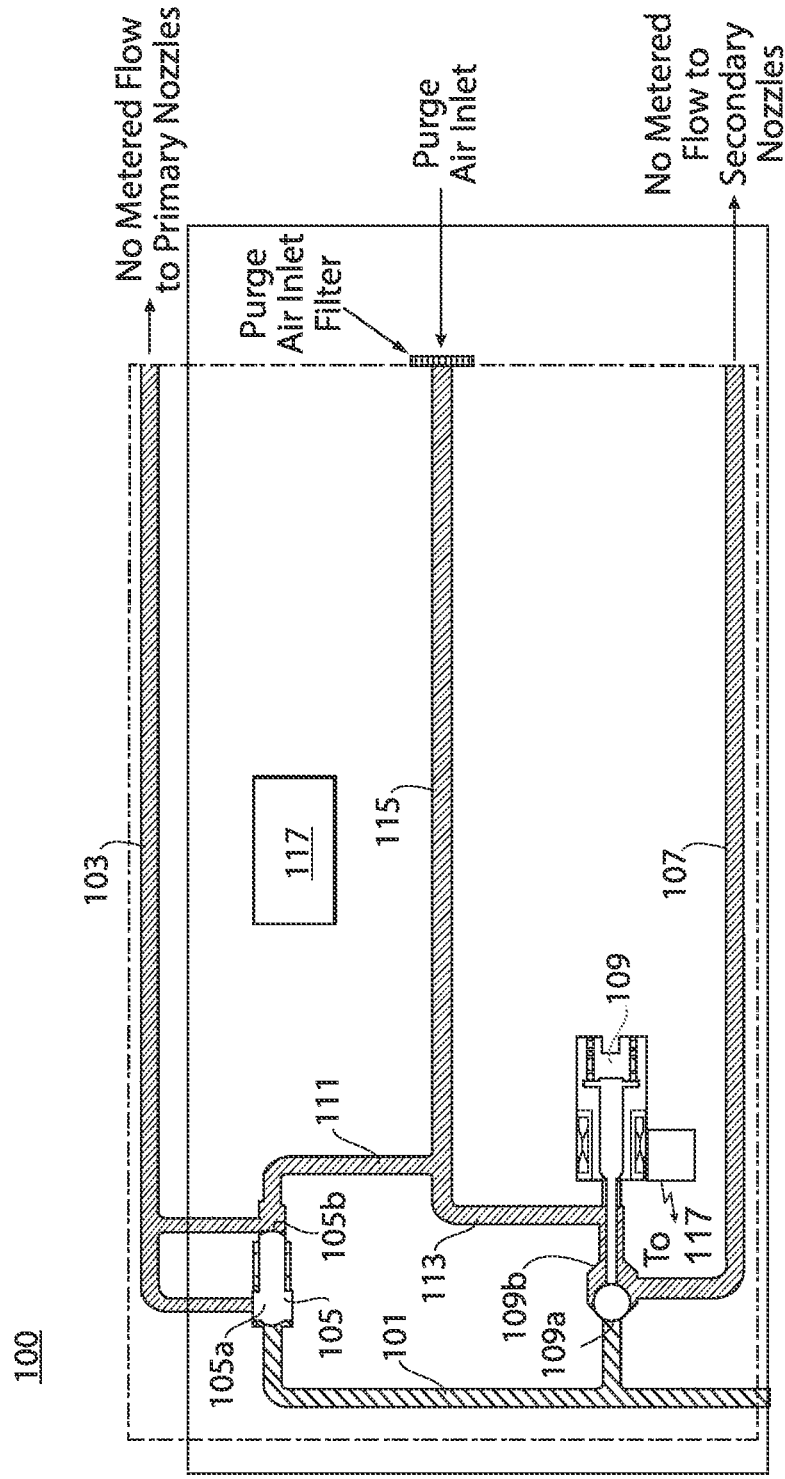
FIG. 3 is a schematic diagram of the embodiment of FIG. 1, shown in a complete purge mode where the primary flow line and the secondary flow line have been purged.

Referring to FIGS. 1-3, a fluid injection system 100 can include a main flow line 101 configured to pass injectant flow therethrough. The system 100 can include a primary flow line 103 connected to the main flow line 101 and configured to provide a primary portion of the injectant flow from the main flow line 101 to a primary injector (not shown). The system 100 can include a primary flow valve 105 disposed between the primary flow line 103 and the main flow line 101 and configured to allow injectant flow to the primary flow line 103 from the main flow line 101 in an open primary flow valve state (e.g., as shown in FIGS. 1 and 2), and to prevent injectant flow to the primary flow line 103 from the main flow line 105 in a closed primary flow valve state (e.g., as shown in FIG. 3).

The system 100 can include a secondary flow line 107 connected to the main flow line 101 and configured to provide a secondary portion of the injectant flow from the main flow line 101 to a secondary injector (not shown). The system 100 can include a secondary flow valve 109 disposed between the secondary flow line 107 and the main flow line 101 (e.g., on the secondary flow line 107) and configured to selectively allow injectant flow to the secondary flow line 107 from the main flow line 101 in an open secondary flow valve state (e.g., as shown in FIG. 1), and to prevent injectant flow to the secondary flow line 107 from the main flow line 101 in a closed secondary flow valve state (e.g., as shown in FIGS. 2 and 3).

The system 100 can include a primary purge branch 111 configured to be in fluid communication with the primary flow line 103 in the closed primary flow valve state (e.g., as shown in FIG. 3) and to not be in fluid communication with the primary flow line 103 in the open primary flow valve state (e.g., as shown in FIGS. 1 and 2). The system 100 can include a secondary purge branch 113 configured to be in fluid communication with the secondary flow line 107 in the closed secondary flow valve state (e.g., as shown in FIGS. 2 and 3) and to not be in fluid communication with the secondary flow line 107 in the open secondary flow valve state (e.g., as shown in FIG. 1).

The primary purge branch 111 and the secondary purge branch 113 can be configured to be in fluid communication with a purge gas line 115 to receive a purge gas flow from the purge gas line 115. In certain embodiments, the primary purge branch 111 and the secondary purge branch 113 can form part of the purge gas line 115. The purge gas line 115 can be connected to any suitable purge gas source (e.g., compressor bleed air from a turbomachine).

In certain embodiments, e.g., as shown, the first purge branch 111 and the second purge branch 113 can be in fluid communication such that there is no valve between the first purge branch 111 and the second purge branch 113. Any other suitable arrangement is contemplated herein.

In certain embodiments, the primary flow valve 105 can be a pressure actuated shuttle valve, e.g., as shown, and can be configured to transition from the closed primary flow valve state (e.g., as shown in FIGS. 2 and 3) to the open primary flow valve state (e.g., as shown in FIG. 1) when pressure in the main flow line 101 exceeds a pressure in the purge gas line 115 such that the primary flow valve 105 prevents fluid communication between the primary purge branch 111 and the primary flow line 103 when the pressure in the main flow line 101 exceeds a pressure in the purge gas line 115.

The primary flow valve 105 can be connected between the main flow line 101 and the primary flow line 103 on a front side 105$a$ thereof and between the primary purge branch 111 and the primary flow line 103 on a back side thereof 105$b$. The primary flow valve 105 can be configured to block either purge gas from the primary flow line 103 or injectant from the primary flow line 103 (e.g., as shown). For example, the primary flow valve 105 can be configured to block purge gas from the primary flow line 103 in the open primary flow valve state and to block injectant from the primary flow line 103 in the closed primary flow valve state. Such an arrangement allows the use of a single valve for primary flow and primary line purging.

The secondary flow valve 109 can be connected between the main flow line 101 and the secondary flow line 107 on a first side 109a thereof and between the secondary purge branch 113 and the secondary flow line 107 on a second side thereof 109b. The secondary flow valve 109 can be configured to block either purge gas from the secondary flow line 107 or injectant from the secondary flow line 107 (e.g., as shown). For example, the secondary flow valve 109 can be configured to block purge gas from the secondary flow line 107 in the open secondary flow valve state and to block injectant from the secondary flow line 107 in the closed secondary flow valve state. Such an arrangement allows the use of a single valve for secondary flow and secondary line purging.

The secondary flow valve 109 can be a solenoid valve having an energized position and a de-energized position. The energized position can correspond to the open secondary flow valve state and the de-energized position can correspond to the closed secondary flow valve state. The opposite is contemplated herein. The secondary flow valve 109 can include a pintle type valve, e.g., as shown, or any other suitable type of controllable valve.

The system 100 can include a controller 117 configured to control the secondary flow valve 109 to move the secondary flow valve 109 between the open secondary flow valve state and the closed secondary flow valve state. The controller 121 can include any suitable hardware module(s) and/or software module(s) to configure to perform and suitable function, e.g., any sequence and/or method disclosed herein.

The controller 117 can be configured to execute a purge sequence from an operational state (e.g., as shown in FIG. 1) where injectant flow is flowing through both the primary and secondary flow lines 103, 107. The purge sequence can include closing the secondary flow valve 109 to shut off injectant flow to the secondary flow line 107 from the main flow line while simultaneously causing purge gas flow to purge the secondary flow line 107. The purge sequence can include allowing injectant flow in the primary flow line 103 to reduce in pressure to below the purge gas pressure to cause the primary flow valve 105 to move to the closed primary flow valve state simultaneously causing purge gas flow to purge the primary flow line 103, e.g., after closing the secondary valve 109. Any other suitable sequence(s) and/or portion(s) thereof are contemplated herein.

In accordance with at least one aspect of this disclosure, a fuel system can include a fluid injection system having a single controllable valve (e.g., secondary valve 109) and a single passive valve (e.g., primary valve 105) arranged to cause selective and/or sequential purging of a secondary flow line and a primary flow line. The controllable valve and the passive valve can be the only valves in the fluid injection system. The controllable valve can be a solenoid valve. The passive valve can be a pressure actuated shuttle valve. Any other suitable valve types are contemplated herein.

In accordance with at least one aspect of this disclosure, a method can include operating a single controllable valve to purge a secondary flow line of a fluid injection system with a purge gas flow, and causing a passive valve to open using a purge gas pressure to cause purging of a primary flow line of the fluid injection system after purging the secondary flow line. Operating the controllable valve can include closing the secondary flow valve to shut off injectant flow to the secondary flow line from the main flow line while simultaneously causing purge gas flow to purge the secondary flow line. Causing a passive valve to open can include allowing injectant flow in the primary flow line to reduce in pressure to below the purge gas pressure to cause the primary flow valve to move to the closed primary flow valve state simultaneously causing purge gas flow to purge the primary flow line. Any other suitable method(s) and/or portion(s) thereof are contemplated herein.

Certain embodiments include a combination of a single solenoid and one shuttle valve used to manage fluid and purge air flow. Primary flow can be commanded when a pump is spun up (e.g., either mechanically or electrically), and as the injectant fluid pressure increases above the purge air pressure the passive primary flow valve shuttles to connect the injectant fluid to the primary flow path. One solenoid can be used to switch between injection fluid and purge air on the secondary injection lines and the shuttle valve performs the same function on the primary flow line. Secondary flow can be activated by commanding the solenoid to shuttle the active secondary flow valve into the state that connects the secondary flow path with the injectant fluid. As the operating conditions no longer require secondary injection, the system can command the secondary solenoid to shuttle the valve to connect purge air with the secondary flow path.

Purging of the secondary flow line can be user selectable and can be done at any time by, e.g., de-energizing the solenoid. Purge air can then enters the secondary flow path to evacuate any remaining injectant fluid. Once the operating conditions no longer require primary injection, the pump can be commanded off and the fluid pressure begins to decay in the primary flow path. Eventually the fluid pressure will drop to a sufficient level for the purge air pressure to shuttle the passive primary flow valve allowing purge air to flow down the primary flow path. Thus, purging of the primary flow line can be achieved based on system pressures. For example, only once injection fluid pressure has dropped below purge air pressure will the shuttle valve change states allowing purge air to flow down the primary injection line.

Certain embodiments can meet engine injection needs and allow purging with only two three-way valves, one passive and one active. Embodiment can provide an ability to have a control system command injectant flow and purge air on/off, while allowing differentiation between primary and secondary purge operation through the use of control laws and passive mechanical valve actuation.

Embodiments can reduce the build-up and/or clogging of fluid lines and nozzles, while minimizing the number of solenoids/control valves required to accomplish the task in injection systems for aircraft gas turbines. Embodiments can eliminate the need for a separate solenoids for each fluid in each path (e.g., primary purge air, primary flow, secondary purge air, and secondary flow) which reduces control system complexity (e.g., in control laws, Built-In Test, and reliability). Embodiments can trade four solenoids for a passive valve and one solenoid controlled valve which can reduce recurring costs.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel system for a turbomachine, comprising:
    a fluid injection system, comprising
        a main flow line;
        a primary flow line;
        a secondary flow line;
        a purge gas flow line;
        a single controllable valve; and
        a single passive valve,
        wherein the primary flow line is in fluid communication with the purge gas line via the single passive valve and the secondary flow line is in fluid communication with the purge gas flow line via the single controllable valve,
        wherein the single controllable valve and the single passive valve are arranged to permit selective and/or sequential purging of the secondary flow line and the primary flow line with purge gas from the purge gas flow line,
    wherein:
        in an operational mode, the single passive valve permits injectant flow through the primary flow line and the single controllable valve permits injectant flow through the secondary flow line, and
        in a secondary flow line purge mode, the single controllable valve is configured to shut off injectant flow to the secondary flow line from the main flow line and simultaneously cause purge gas from the purge gas flow line to purge the secondary flow line while the single passive valve permits injectant to pass into the primary flow line from the main flow line.

2. The fuel system of claim 1, wherein there are no valves in the purge gas flow line upstream of the single controllable valve and the single passive valve.

3. The fuel system of claim 1, wherein there are no valves in the purge gas flow line at a branch point between a primary purge branch and a secondary purge branch.

4. The fuel system of claim 1, wherein the controllable valve is a solenoid valve.

5. The fuel system of claim 4, wherein the passive valve is a pressure actuated shuttle valve.

* * * * *